(12) United States Patent
Mizrahi

(10) Patent No.: US 7,706,982 B2
(45) Date of Patent: Apr. 27, 2010

(54) EARTHQUAKES AND SUN DISTURBANCES

(76) Inventor: Ezra Mizrahi, 96B Hertzel Boulevard, Jerusalem (IL) 96347

( * ) Notice: Subject to any disclaimer, the term of this patent is extended or adjusted under 35 U.S.C. 154(b) by 26 days.

(21) Appl. No.: 12/066,408

(22) PCT Filed: Sep. 11, 2006

(86) PCT No.: PCT/IL2006/001061

§ 371 (c)(1),
(2), (4) Date: Mar. 11, 2008

(87) PCT Pub. No.: WO2007/031997

PCT Pub. Date: Mar. 22, 2007

(65) Prior Publication Data

US 2008/0234940 A1    Sep. 25, 2008

Related U.S. Application Data

(60) Provisional application No. 60/716,345, filed on Sep. 12, 2005.

(51) Int. Cl.
*G01V 1/00* (2006.01)
(52) U.S. Cl. .................. 702/15; 324/344; 324/345; 324/348; 340/601; 340/690
(58) Field of Classification Search .................. 702/15; 324/345, 323, 344, 347, 348, 300, 72; 340/600, 340/601, 690, 539.26, 539.1; 367/180, 140, 367/157
See application file for complete search history.

(56) References Cited

U.S. PATENT DOCUMENTS

| | | | | |
|---|---|---|---|---|
| 5,270,649 A * | 12/1993 | Laukien | ...................... | 324/300 |
| 5,521,508 A * | 5/1996 | Merzer | ...................... | 324/345 |
| 5,694,129 A * | 12/1997 | Fujinawa et al. | .............. | 342/22 |
| 5,742,166 A * | 4/1998 | Park | ........................... | 324/344 |
| 5,783,945 A * | 7/1998 | Balbachan | .................. | 324/348 |
| 5,890,094 A * | 3/1999 | Zschau | ........................ | 702/15 |
| 6,100,697 A * | 8/2000 | Park | ........................... | 324/344 |
| 6,307,375 B1 * | 10/2001 | Park | ........................... | 324/344 |
| 6,373,396 B2 * | 4/2002 | Zamfes | ....................... | 340/690 |
| 6,462,549 B1 * | 10/2002 | Curtis et al. | ................. | 324/323 |
| 6,704,658 B2 * | 3/2004 | Kawashima | ................. | 702/15 |
| 6,728,640 B2 * | 4/2004 | Mandal et al. | ................ | 702/15 |
| 7,280,919 B2 * | 10/2007 | Yomoda et al. | ................ | 702/15 |
| 7,280,920 B1 * | 10/2007 | Whiteside et al. | ............. | 702/15 |
| 2002/0011936 A1 * | 1/2002 | Zamfes | ....................... | 340/690 |
| 2006/0197024 A1 * | 9/2006 | Manber | ................ | 250/363.05 |

* cited by examiner

*Primary Examiner*—Carol S Tsai
(74) *Attorney, Agent, or Firm*—William H. Dippert; Eckert Seamans Cherin & Mellott, LLC

(57) ABSTRACT

A method of tracking seismic activity through monitoring sunspots and sun disturbances and correlating them with a developed model in order to map out specific locations where an earthquake will consequently appear is provided (FP). The method of comprises mapping coordinates of electromagnetic disturbances on the sun, calculating the coordinates while taking into consideration Earth/sun geometry and relative positions (FP). These coordinates are consequently mapped to a location and time on earth wherein the location and time predicts the location and approximate time of the earthquake, which will consequently occur on earth.

13 Claims, 12 Drawing Sheets

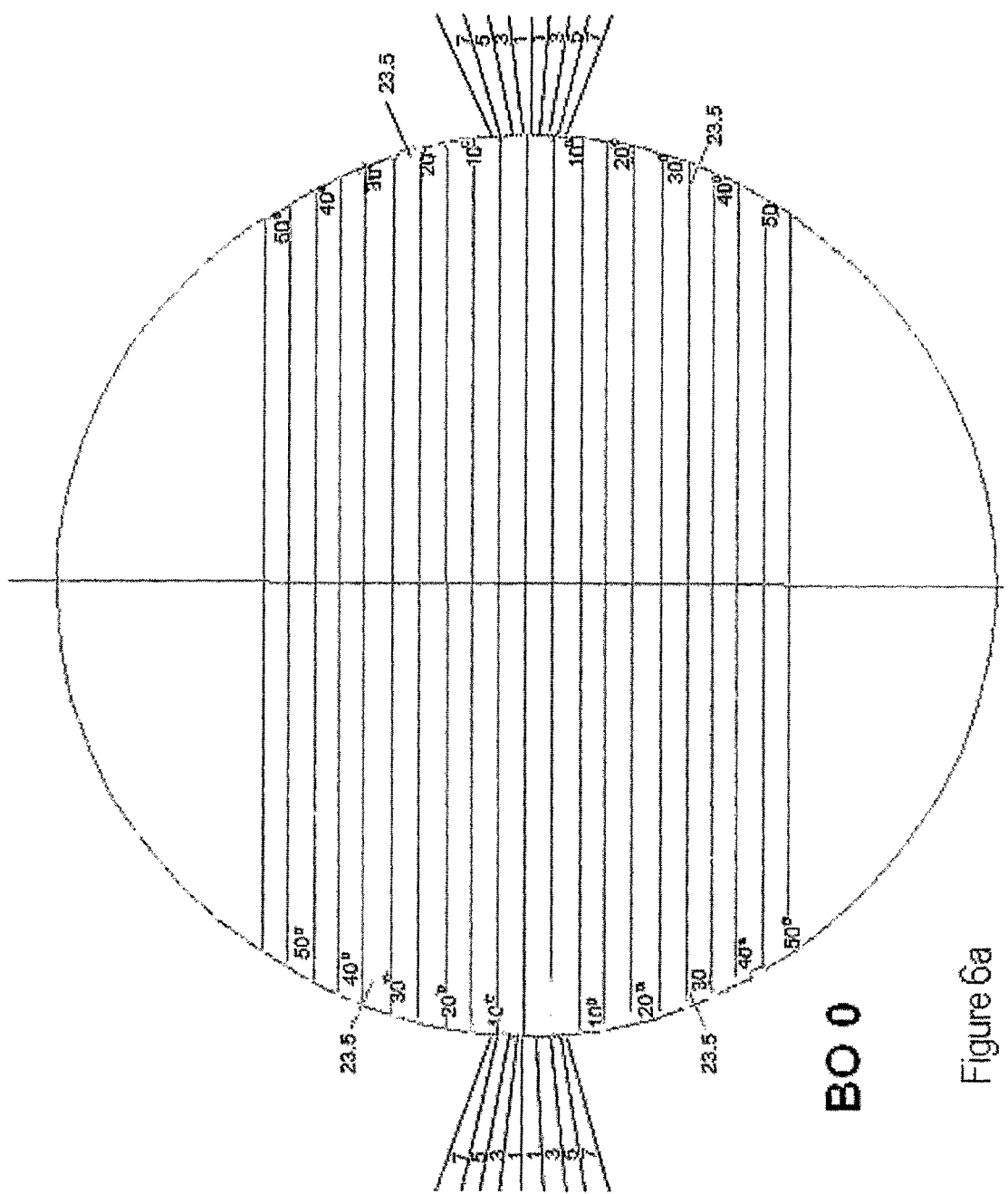

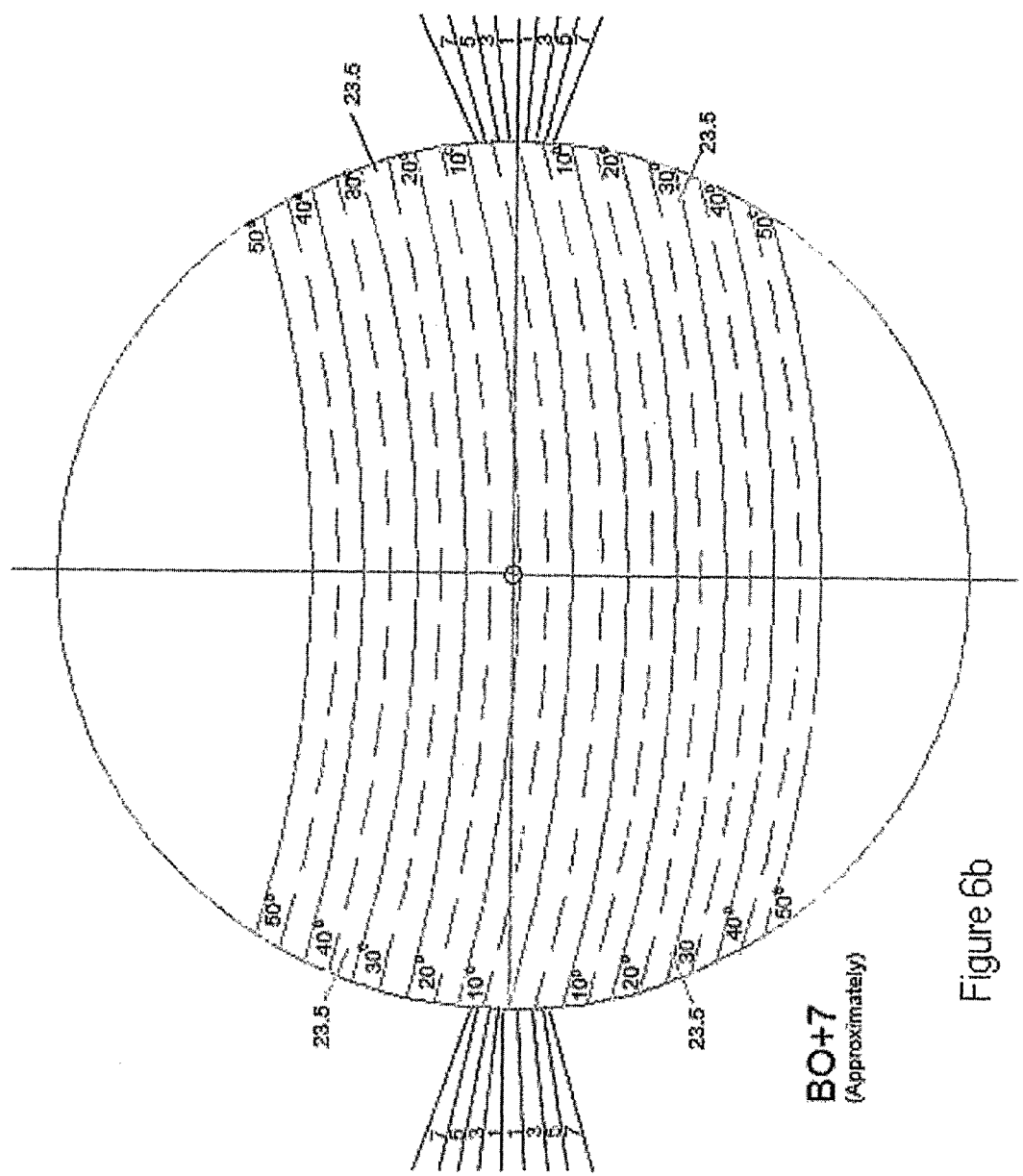

Little Ice Age

EARTHQUAKES AND SUN DISTURBANCES

CROSS-REFERENCE TO RELATED APPLICATIONS

The present application is the U.S. National Phase of International Patent Application No. PCT/IL2006/001061, filed Sep. 9, 2006, which in turn is based upon and claims priority from U.S. Provisional Patent Application Ser. No. 60/716,345, filed Sep. 12, 2005, each of which is incorporated by reference in its entirety.

FIELD OF THE INVENTION

The present invention relates to tracing seismic activities. More particularly, the present invention relates to tracing seismic activities that are directly connected to sunspots and sun disturbances.

BACKGROUND OF THE INVENTION

Earthquakes are natural disasters generated by seismic waves and tectonic pressure. They are currently understood to be unpredictable and can be very destructive. Statistics show that during one year, more than 20-30 cases of strong and destructive earthquakes occur over the whole planet.

The time and location of earthquakes are understood to be non-predictable and are one of the major concerns in the world. The consequences may be harsh due to the destructive nature of the earthquake itself, as well as from its secondary effects such as fires, pollution, floods, etc.

At this time science is unable to predict the exact time and location of an earthquake through current scientific methods.

From all of the planets in our solar system, Earth is unique and is the only planet to exhibit tectonic activity (other similar planets, such as Mars and Venus, show signs of volcanic activity in the past but there appears to be no evidence of tectonic activity neither in the past nor today). The earth's crust is divided up into tectonic plates that move around the lithosphere. These plates buckle and grind up against each other at the edges. These plates are constantly active (due to convection processes that cause different phase changes by the core's heat, gravity and radioactive emissions from within the Earth). These different forces act together to cause earthquakes.

Before an earthquake takes place, the pressure and friction between the rocks builds up until it reaches a 'critical point' (the Earth's crust is made up from different minerals; mostly containing oxygen, that are locked into crystals). Electromagnetic pulses are generated through these minerals (see, for example, in Freidman, January December 2005 and Brent D. Johnson, Spectrophotometer Observes Radiation from Rocks, (accessed 23.12.05) and are released into the Earth's atmosphere. The electromagnetic pulses that are emitted from Earth's crust into the atmosphere are characterized by coherent light and continue their spectral signature when they hit the sun's photosphere. Reed et al. in THz Science and Technology Network, terahertz (THz) radiation, Physical Review Letters, 13 Jan. 2006 found that measurable coherent light can be observed emerging from the crystal in experiments, whereby coherent light was produced by shock waves through a crystal.

The sun's photosphere is a thin layer that is highly sensitive to electro-magnetic changes (like the Earth's ionosphere). The model correlates sunspot disturbances and maps them to relative locations on Earth. In addition, the pattern of these disturbances, outlined in the EMI archive, exhibits unique characteristics that emanate from different source locations from Earth (drawing on crystallography, spectroscopia, and optical non-linearity).

In this way, the Earth may be compared to a pulsing projector (like a pulsar) where the sun acts as a responsive surface reflecting the pulses that leave their traces on its photosphere.

Scientific research has been driven by the relative size and energy levels of the Earth in relation to the sun, which has influenced past and current scientific research to explore the effect of the sun on the Earth. Notably, fewer sunspot activities have been recorded during The Little Ice Age (See FIG. 8a) but the exact relationship between sun disturbances and earthquakes has not been previously understood. The inventor of the present invention has developed a model that reverses the pre-supposition that the sun is acting on the earth, and suggests that the sun is exhibiting traces that are initiated on Earth. These traces can be identified as sun disturbances that evolve as local reactions that act in response to the trigger, which is the pre-earthquake activity.

In accordance with that, it must be presumed that the increase in seismic activity correlates directly with the number and specific location of sun disturbances taking into consideration the influences of the seasonal changes of the magnetic poles of the sun and their relationship to Earth. The correlation may be discerned once the properties of the declination, Earth's inclination, and the sun's BO angle between the Earth and the sun are determined. The disturbances may then be mapped to the past or potential location of an Earthquake epicentre. Using this 10-step model that is illustrated in FIG. 1, the inventor of the present invention tracked sun disturbances and cross-checked them over a period of four years to illustrate an occurring frequency, relative location, and global pattern as will be shown herein after. The model enables a correlation of the pertinent data and demonstrates not only a documentation of past earthquake activity, but can also be successfully implemented to predict future earthquake activity.

SUMMARY OF THE INVENTION

It is an object of the present invention to provide a method of tracking seismic activity through monitoring sunspots and sun disturbances and correlating them with the developed model in order to map out specific locations where an earthquake will consequently appear.

Therefore and in accordance with a preferred embodiment of the present invention, it provides a method of correlating earthquakes on earth to electromagnetic disturbances on the sun comprising:
  mapping coordinates of electromagnetic disturbances on the sun;
  calculating said coordinates;
  mapping the calculated coordinates onto a location and time on earth;
  whereby the location and time on earth predicts the location and approximate time of the earthquake which will consequently occur on earth.

Furthermore, in accordance with another preferred embodiment of the present invention, the electromagnetic disturbances are based on those observed on EIT images.

Furthermore, in accordance with another preferred embodiment of the present invention, the electromagnetic disturbances are based on those observed on a magnetogram image.

Furthermore, in accordance with another preferred embodiment of the present invention, said mapping coordinates is performed by marking the disturbances on a transparency of sun's diameter on a grid and transferring the marked coordinated onto a broadsheet.

Furthermore, in accordance with another preferred embodiment of the present invention, said mapping the calculated coordinates is performed by marking said coordinates on a scaled BO transparency divided into lines of latitude.

Furthermore, in accordance with another preferred embodiment of the present invention, said location is determined from the line of latitude using a model in which an angle of declination of a corresponding day is adjusted to the indications of sunspot disturbances from the broadsheet transparency and wherein the centre of the BO transparency is lined up to the center of the broadsheet and rotated to the daily declination, and wherein the center of the BO transparency is also moved up or down along the center of the broadsheet in accordance with the daily declination.

Furthermore, in accordance with another preferred embodiment of the present invention, the method further comprises determining the location of a potential earthquake on the line of longitude.

Furthermore, in accordance with another preferred embodiment of the present invention, determining the location of the potential earthquake on the line of longitude is performed by identifying the disturbances on an EIT and a magnetogram image.

Furthermore, in accordance with another preferred embodiment of the present invention, determining the location of the potential earthquake on the line of longitude is further comprises a: referencing to the pattern archive (EMI Archive); b. statistical analyzing the location of tectonic plates that indicated current seismic activity and c. geological mapping of characteristics of the earth's crust.

Furthermore, in accordance with another preferred embodiment of the present invention, the method further comprises enhancing results from the coordinates harvested from EIT and magnetogram images.

Furthermore, in accordance with another preferred embodiment of the present invention, wherein enhancing the results comprising: a. using a global seismic map; b. examining historic seismic activity of the earth such as occurrence, magnitude and depth and c. taking into consideration the movements of the tectonic plates.

Furthermore, in accordance with another preferred embodiment of the present invention, the prediction of the earthquake is performed by an online simulator.

Additionally and in accordance with yet another preferred embodiment of the present invention, the earthquake has a magnitude that is calculated by the shape of the pattern, the speed in which the sun disturbance develops and the size and location of the disturbance.

BRIEF DESCRIPTION OF THE FIGURES

In order to better understand the present invention and appreciate its practical applications, the following Figures are attached and referenced herein. Like components are denoted by like reference numerals.

It should be noted that the figures are given as examples and preferred embodiments only and in no way limit the scope of the present invention as defined in the appending Description and Claims.

FIGS. 6a-b illustrate BO latitudes (BO 0 and BO 7) used in the process according to a preferred embodiment of the present invention.

DETAILED DESCRIPTION OF THE INVENTION

Figure 1:
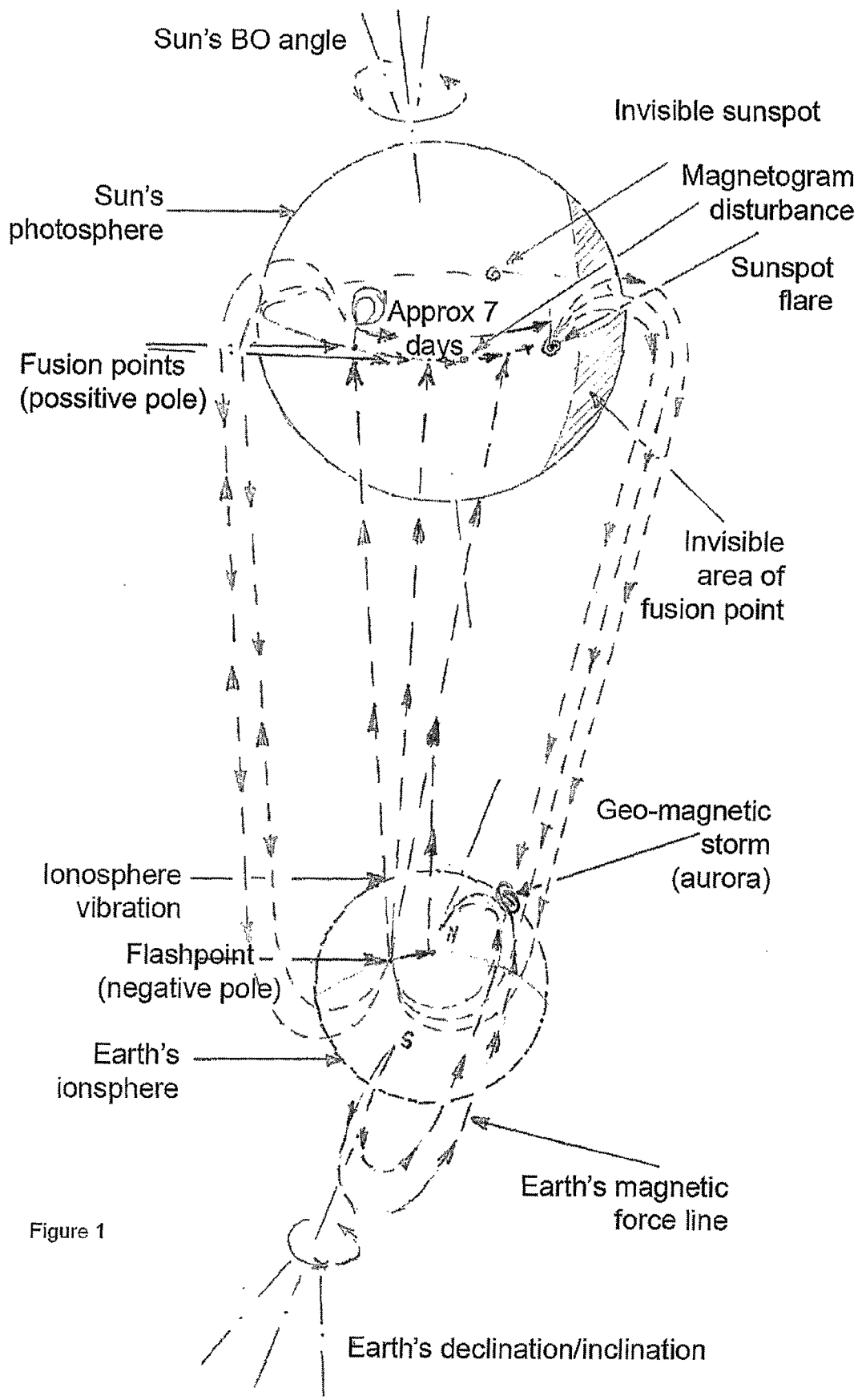
FIG. 1 schematically illustrates a model developed by the inventor in which show EM pulses and the earth/sun/earth relationship.

The present invention provides a new and unique model that correlates seismic activity on Earth directly with the number and specific location of sun disturbances. This model is utilized in order to predict earthquakes through sunspot disturbances. This tracking of sun activities is essential to forecast future earthquakes in order to warn authorities to avoid the consequences of potential damage to human and material resources.

The Sun's Electro-Magnetic Disturbances

Sunspots are strong magnetic fields (3000 gauss) apparently formed by convection processes. The electromagnetic disturbance of sunspots can be compared to tectonic activity, such as a volcanic eruption on the Earth, behaving similarly to convection processes on the tectonic plates.

The disturbances in the sun's magnetic field occur between the area that releases heat (convective zone) and the radiating area (radioactive zone) creating traces on the sensitive photosphere.

The sunspot cycle is not constant (approximately 8-11 years) and repeats when the solar poles are reversed. Sunspots usually appear in pairs or groups (clusters) and with a life span of a few days or weeks.

In all probability, the direction of the sun's magnetic lines of force change the magnetic disturbances that develop as sunspots appear on a magnetogram—at solar minimum—as small disturbances.

The behavior of the sun disturbances, their location, and especially their cycle in the photosphere indicates that disturbances evolve from an external magnetic source. The Earth's core (differentiation) is made out of an internal solid with a diameter of 2400 km, surrounded by an external layer of 7000 km diameter of hot, liquid metal. The core revolves slower than its external layer and the outer crust. As a result, there are differences between the speed of the core electrons and those in the outer layer [X. Song and P. G. Richards, Detecting Possible Rotation of Earth's Inner Core, Nature 382, 221 (1996)]. These movements result in a natural dynamo.

In the outer core of the Earth, the very hot liquid metal (mostly iron) seems to behave like the sun's core, in that it moves and ripples and causes electro-magnetic and electric storms in the depth of the Earth (explained also by Robert Roy Britt in "When North Becomes South: New Clues to Earth's Magnetic Flip-Flops". About one percent of the electromagnetic field escapes and combines with other elements to create the Earth's magnetic field. According to the behavior of the Earth's core, the geo and electronic-magnetic field also fluctuate. The magnetic axis of the Earth is slightly tilted in relationship to the geographical axis with an inclination of approximately 11 degrees. The strength of the magnetic field is stronger at the poles and weaker around the equator region. Had the axis of the magnetic field been parallel to the geographic axis of the Earth, then the geographic latitudes would follow the same lines of the magnetic latitudes. However, the magnetic lines are similar, but not identical to the geographical lines of latitude. Superimposing the magnetic equatorial line onto the tectonic plate map produces shapes (like a butterfly). The tectonic plates are associated with convection processes.

In addition, the tectonic plates on the Earth's crust are affected by the geo-magnetic field. The main "butterfly" shape appears almost perfectly balanced when superimposed on the Pacific plates (around the Ring of Fire). A further butterfly-like shape emerges from the African and Indian plates. The rest of the plates also complete this magnetic balance with the magnetic equator marking the middle of the 'butterfly'.

Figure 2:
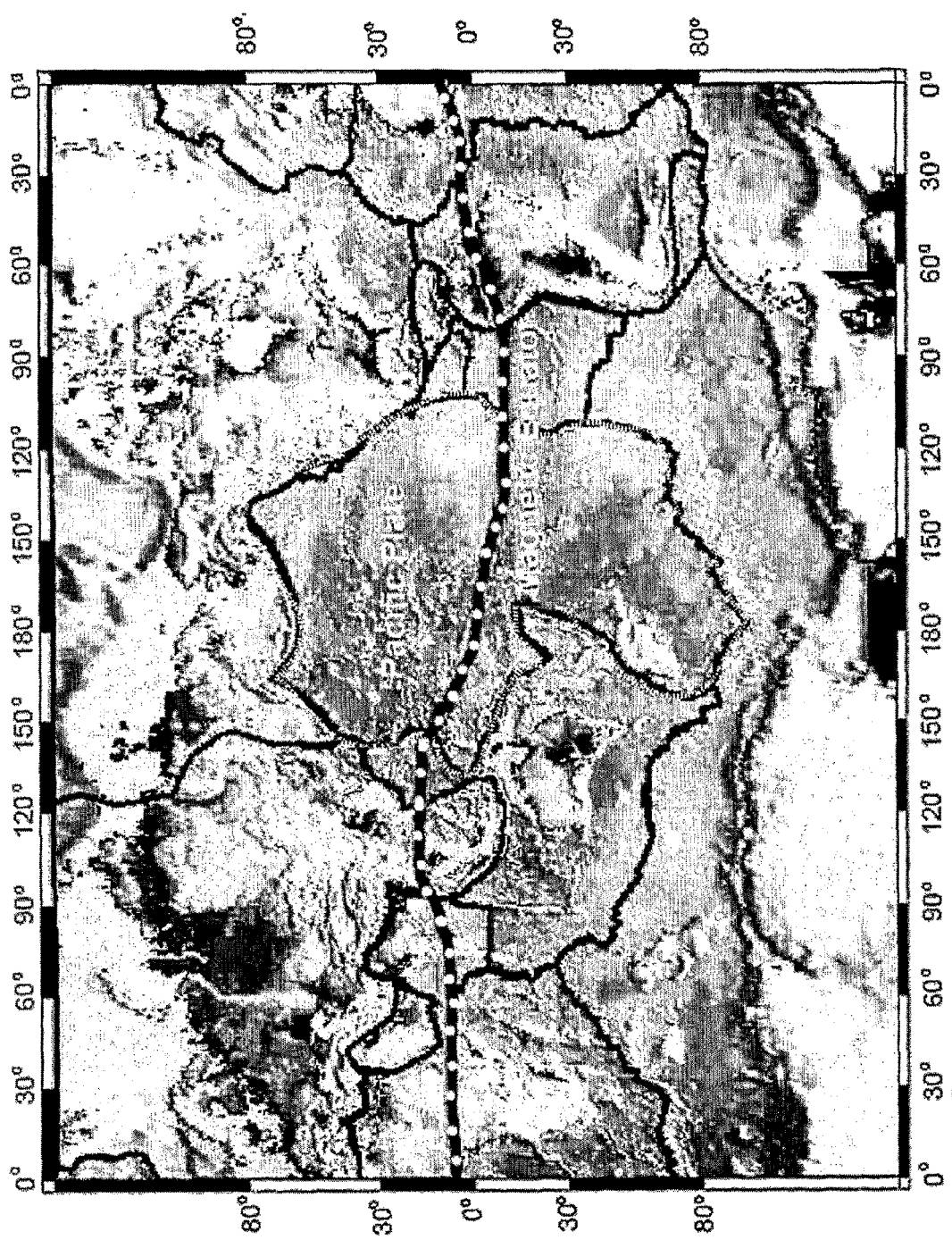
FIG. 2 illustrates a map showing the Pacific Plate and the Magnetic Equator.

Reference is now made to FIG. 2 illustrating a map showing the Pacific Plate that makes up 80% of the tectonic activity.

The following examples demonstrate the pairing and magnetic balance of earthquakes.

| Date | Lat. | Long. | Mag. | Location |
|---|---|---|---|---|
| 2006-09-04 | 9.24 S | 107.57 E | 5.3 | SOUTH OF JAWA, INDONESIA |
| 2006-09-05 | 7.71 N | 126.51 E | 5.6 | MINDANAO, PHILIPPINE ISLANDS |
| 2006-08-23 | 5.54 N | 94.58 E | 5.0 | NORTHERN SUMATERA, INDONESIA |
| 2006-08-23 | 4.58 S | 153.56 E | 5.0 | NEW IRELAND |
| 2006-08-31 | 28.81 N | 130.01 E | 5.5 | RYUKYU ISLANDS, JAPAN |
| 2006-09-01 | 24.63 S | 168.58 E | 5.0 | NEW CALEDONIA REGION |
| 2006-08-24 | 57.61 S | 148.30 E | 5.5 | WEST OF MACQUARIE ISLAND |
| 2006-08-24 | 51.14 N | 157.59 E | 6.5 | NEAR E. CST KAMCHATKA PEN |

Accordingly, a 10-step model was developed by the inventor of the present invention in order to determine the location and time of potential earthquakes. The factors taken into consideration in the process include: sun/earth geometry and orbit.

Figure 3:
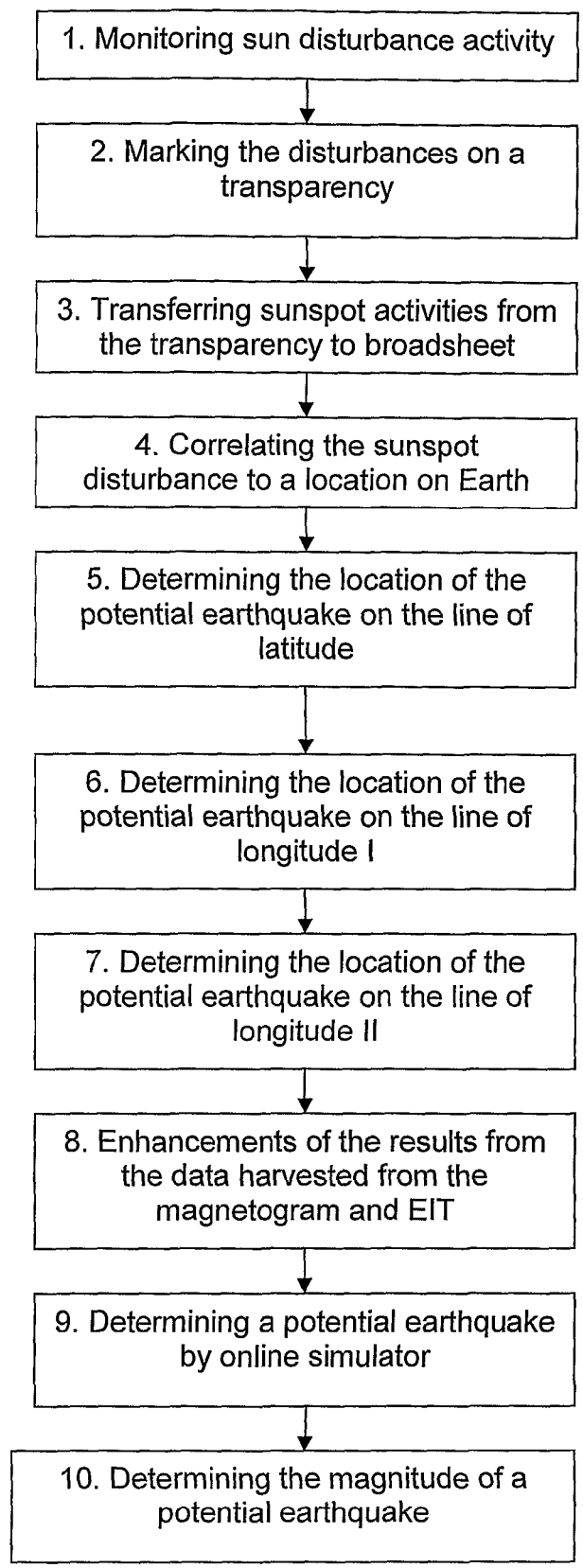
FIG. 3 illustrates a block diagram of the 10-step process of tracking earthquakes in accordance with a preferred embodiment of the present invention.

Reference is now made to FIG. 3 illustrating a block diagram of a 10-step process of tracking earthquakes in accordance with a preferred embodiment of the present invention. The steps of the process are as follows:

1. Monitoring Sun Disturbance Activity:

In this step, the user identifies the initial appearance of sunspot disturbance at UTC time. The evidence of the emergence of new sunspot activity and disturbances are identified from satellite imagery; EIT and magnetograms.

Figure 4:
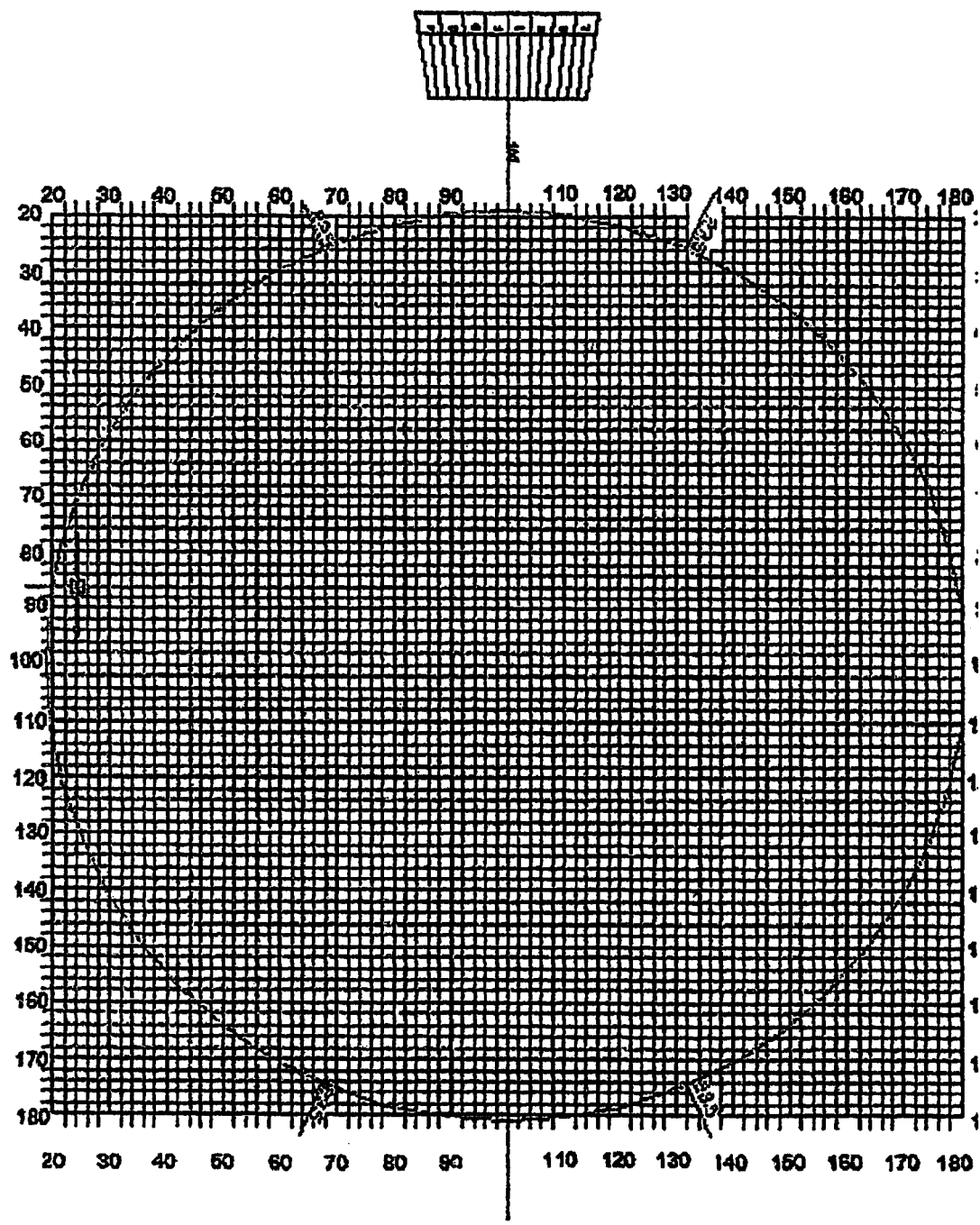
FIG. 4 illustrates a grid of transparency that is used in the process according to preferred embodiment of the present invention.

2. Marking the Disturbances on a Transparency of the Sun's Diameter on a Grid:

The exact coordinates of the sun disturbances (usually the dark areas of the disturbances or alternatively the cloud-like patterns of sunspot activities) are marked on the transparency that is placed over the EIT and magnetogram images directly on the monitor or over a printout of the EIT and magnetogram image. Reference is now made to FIG. 4 sun's diameter grid transparency) illustrating a grid of transparency that is used in the process according to preferred embodiment of the present invention.

Figure 5:
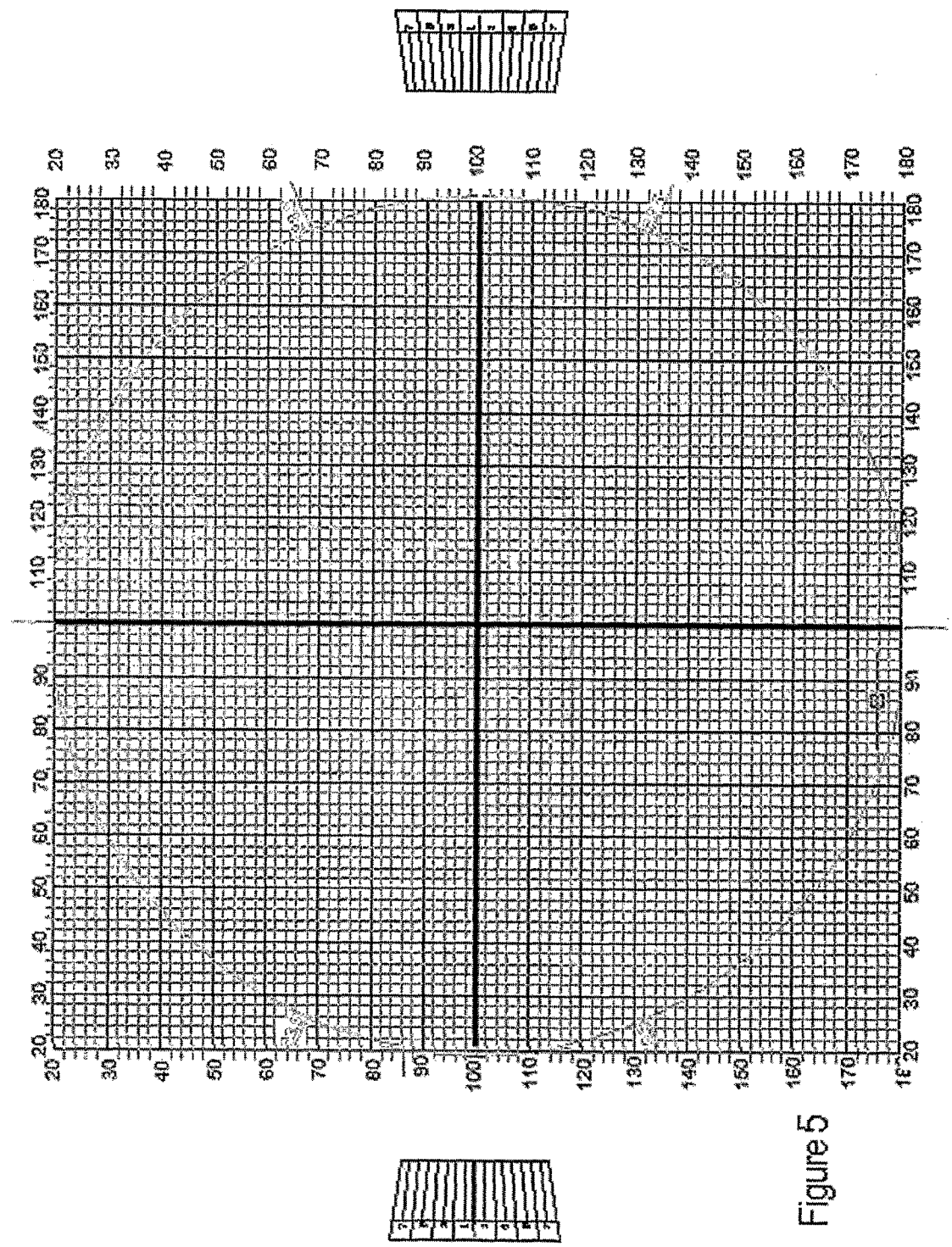
FIG. 5 illustrates a broadsheet used in the process according to a preferred embodiment of the present invention.

3. Transferring Sunspot Activities From the Transparency to a Broadsheet:

The exact coordinates of the sunspot disturbances are then transferred from the transparency onto a broadsheet that has been divided up into a grid on a larger scale (to enable more precise working picture of current sunspot activities). Reference is now made to FIG. 5 illustrating a broadsheet used in the process according to a preferred embodiment of the present invention.

4. Correlating the Sunspot Disturbance to a Location on Earth (Lines of Latitude):

The BO transparency, divided into lines of latitude on the same scale of that of the broadsheet is marked with a full range of BO options (see 2 examples; BO-0 and BO-7. The coordinates on the transparency (sun's diameter grid transparency) can then be transferred to the broadsheet, indicating the same angle of declination+BO.

Reference is now made to FIGS. 6a-b illustrating BO latitudes used in the process according to a preferred embodiment of the present invention.

5. Determining the Location of the Potential Earthquake on the Line of Latitude:

The line of latitude is determined using the model (will be shown in the examples). The angle of declination of the corresponding day is adjusted to the indications of sunspot disturbances from the broadsheet transparency The centre of the BO transparency is lined up to the center of the broadsheet and rotated to the daily declination. In addition, the center of the BO transparency is also moved up or down along the center of the broadsheet in accordance with the daily declination.

Figure 7:
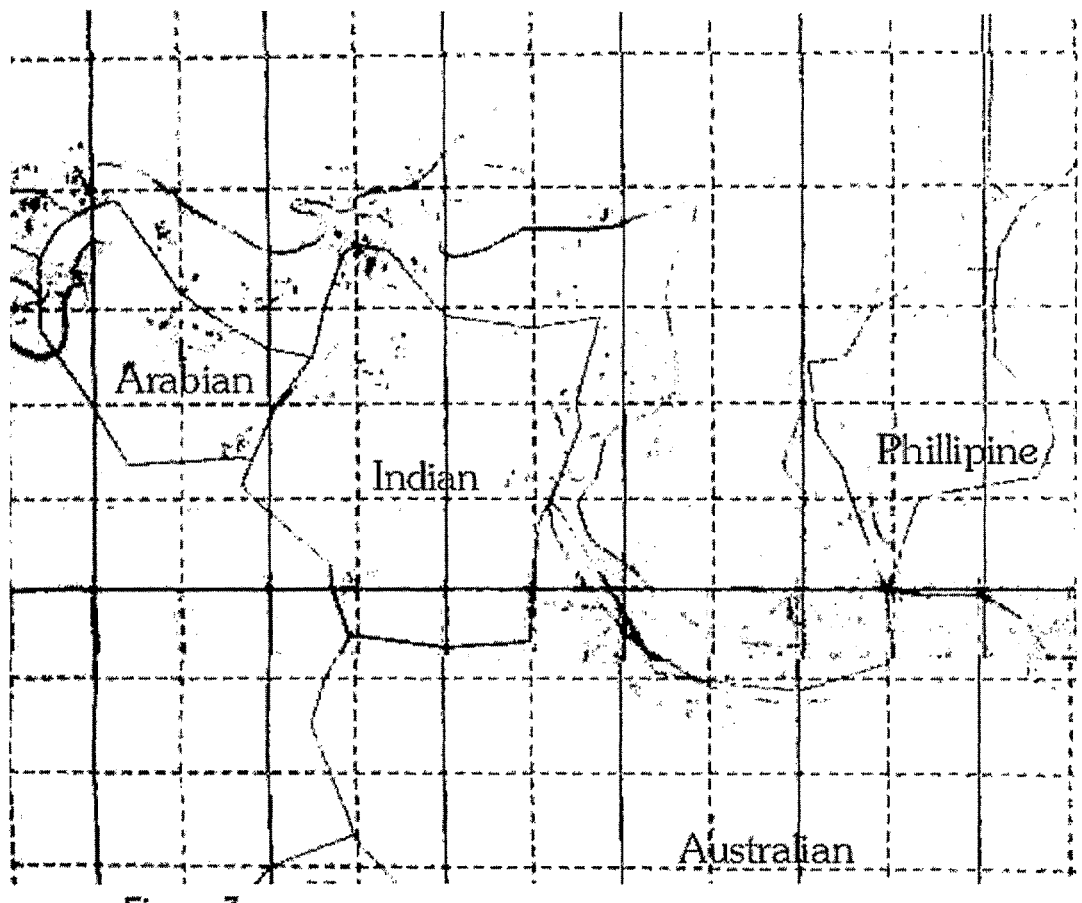
FIG. 7 illustrates a section of the pattern archive (EMI archive) in accordance with a preferred embodiment of the present invention.

6. Determining the Location of the Potential Earthquake on the Line of Longitude I:

The disturbances identified on the EIT and the magnetogram image (where the black markings represent the south pole and the white marking the north pole) exhibit noticeably different patterns that indicate their specific geographical source. Reference is now made to FIG. 7 illustrating an example of a pattern archive (EMI Archive) in accordance with a preferred embodiment of the present invention.

7. Determining the Location of the Potential Earthquake on the Line of Longitude II:

The location of a potential earthquake on a line of longitude is also determined in the following manner:

a. Reference to the pattern archive (EMI Archive) a section is shown in FIG. 7 (the EMI archive documents observations of historic sun disturbance patterns identified from magnetograms over 4 years).

b. Statistical analysis of the location of tectonic plates that indicated current seismic activity.

c. Geological mapping of the characteristics of the earth's crust.

8. Enhancements of the Results From the Data Harvested from the EIT and Magnetogram Images:

The results from these observations may be further enhanced in the following manner:
   a. Using a global seismic map
   b. Examining of historic seismic activity of the area (occurrence, magnitude and depth)
   c. Taking into consideration the movements of the tectonic plates (and transfer of the pressure, seismic balance).

The factors in steps 5, 6, 7 and 8 determine together the location of a potential earthquake.

9. Determining a Potential Earthquake by Online Simulator:

A preferred method to determine longitude in accordance with a preferred embodiment of the present invention is by calculating and determining the relative location of the earth to the sun at all times by using an online simulator using a time zone such as the one shown in Table 1. The time zone and the simulator illustrate the relationship of the Earth to the sun as in the broadsheets ('Y' axis). This enables the inventor to distinguish the amount of time that takes the sun disturbance to develop (usually between 10-12 hours).

10. Determining the Magnitude of a Potential Earthquake:

The earthquake magnitude is calculated by the shape of the pattern, the speed in which the sun disturbance develops and the size and location of the disturbance.

As mentioned herein before, the model was implemented and checked for the past four years, (2001, 2002, 2003, and 2004) to show repeatability. The correlation between earthquakes and sun disturbances consistently occur together in clusters both quantitatively as well as in the order they occur. An example of this correlated activity is demonstrated in the table that illustrates sun and earthquake activity from August 2003 (an example from the 4 year data set). It has been shown that earthquakes produce unequal distribution of mass over the Earth, and the Earth's equilibrium is therefore destabilized. In a short time, other earthquakes appear that compensate for, and adjust to this imbalance, usually at the opposing side of the plate. Therefore with most earthquakes, there is a responding earthquake (balance).

Figure 8A:
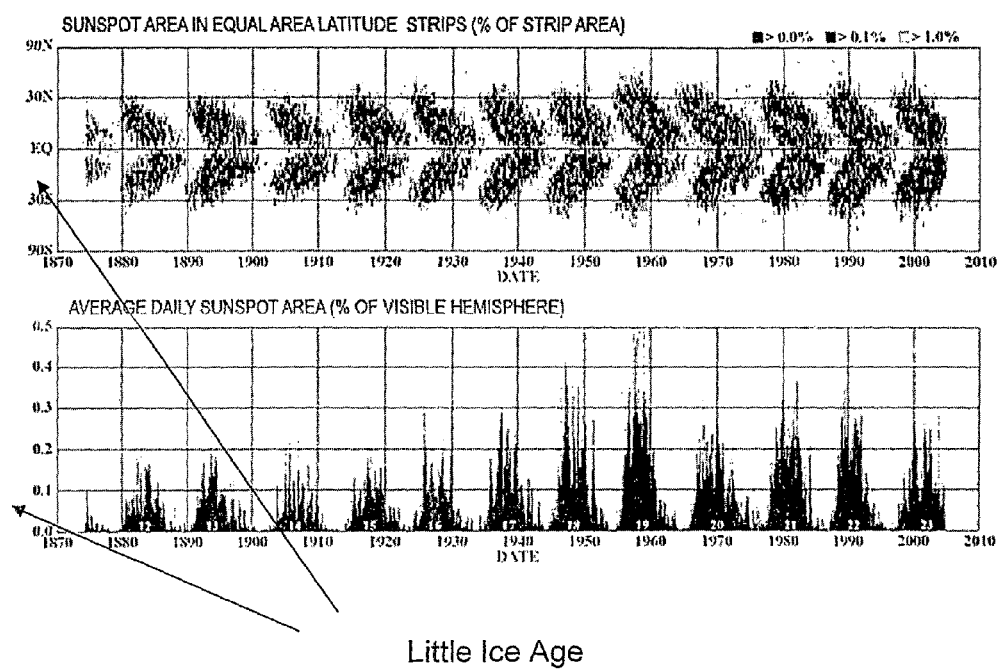
FIG. 8a illustrates daily sunspot area averaged over individual solar rotations and the limited tectonic activity during the Little Ice age.
Figure 8B:
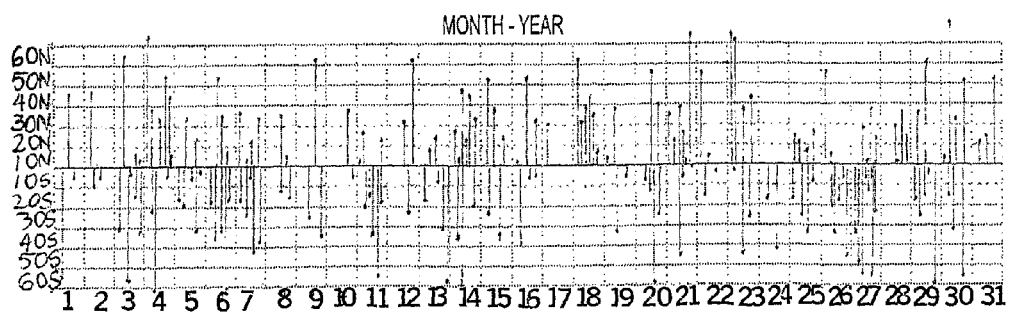
FIG. 8b illustrates earthquake diagram of August 2003 that were checked in an experiment, the balance (pairing) of earthquakes in the northern and southern hemispheres against lines of latitude monitored day by day (over 4.9 magnitude).

Reference is now made to FIG. 8b illustrating earthquake diagram of August 2003 that were evaluated over a specific period of time. The diagram illustrates earthquake occurrences from August 2003 as mapped, by date to their geographic latitude. As shown, numerous earthquakes occur, one after another and illustrate a self-similarity that may be compared to the behavior of sun disturbances. Earthquakes occur in series or clusters that are reminiscent of the ways that sunspots occur.

Reference is now made to FIG. 8a illustrating daily sunspot area average over individual solar rotations. The pairing of earthquakes as shown in the butterfly pattern and the plate map has a similar pattern to the sunspot butterfly pattern.

Each earthquake at each specific location 'acts on' the edges of the connected platelets and initiates the next earthquake, as explained by Ross S. Stein, Aykut A. Barka and James H. Dieterich, Progressive failure on the North Anatolian fault since 1939 by earthquake stress triggering, Geophysical Journal International, 1997, VOL 128, (pp 594-604). The fact that earthquakes come in clusters has a physical explanation—'a large earthquake can trigger another large earthquake on a nearby fault where the static stress increases. This explanation can be found in Davide Castelvecchi, Magnet Theory Meets Earthquakes, ISSN 1539-0748, 2005 by The American Physical Society, 2005.

Earthquake activity was monitored and mapped to sun disturbance activity for August 2003. The results are provided in Table 2 that compares the earthquakes that occurred during that time on the Earth showing the latitude of the earthquake and disturbances on magnetogram as measured by the inventor of the present invention. According to the exact position of the disturbance, the inventor of the present invention calculated according to the 10-steps method explained herein before the latitude in which an earthquake is expected. It can be noticed that the correlation between the results of the calculation is in close proximity to the actual earthquakes that occurred. The earthquake data were taken from the US Geological Survey while sunspots data are from magnetogram images provided by the SOHO LASCO, EIT and MDI teams (X and Y values determined by EMI mapping).

In a series of controlled experiments, additional earthquakes location forecasts were documented and distributed on the 14th and 18th of Oct. 2005 and on 24 Feb. and 6 Mar. 2006.

In each set, the number of forecasts harvested from the data available was idiosyncratic and reflected the potential events that were distinguishable on the specific days that the experiment took place.

The coordinates (in Italic and bold) represent the forecasted locations and the locations (with underline) represent actual earthquakes that occurred during this period:

14 Oct. 2005

| | | |
|---|---|---|
| 1. | *4-6n* | *128-130e* |
| | Mag | 5.8 |
| | Date-Time | Sat Oct 22 12:16:36 2005 UTC (8 days) |
| | Location | 5.96S 130.01E |
| | Region | IN BANDA SEA |
| 2. | *14-16n* | *95-97w* |
| | Mag | 4.1 (this event was published online only after list was compiled) (−2 days) |
| | Date-Time | Wednesday, Oct. 12, 2005 at 23:37:35 (UTC) |
| | Location | 16.249N, 96.842W |
| | Region | OAXACA, MEXICO |
| | Mag | 4.9 |
| | Date-Time | Monday, Oct. 24, 2005 at 01:23:59 (UTC) (10 days) |
| | Location | 17.71N, 105.77W |
| | Region | OFF COAST OF JALISCO, MEXICO |
| | Mag | 4.7 |

-continued

|   |           |                                                      |
|---|-----------|------------------------------------------------------|
|   | Date-Time | Monday, Oct. 24, 2005 at 01:20:57 (UTC) (10 days)    |
|   | Location  | 16.249N, 96.842W                                     |
|   | Region    | OFF COAST OF JALISCO, MEXICO                         |
| 3.| 28-30n| 52-50e                                           |
|   | Mag       | 5.2                                                  |
|   | Date-Time | Thursday, Oct. 20, 2005 at 23:32:24 (6 days)         |
|   | Location  | 31.71N, 50.51E                                       |
|   | Region    | NORTHERN IRAN                                        |
| 4.| 23-25n| 127-128e                                         |
|   | Mag       | 6.6                                                  |
|   | Date-Time | Saturday, Oct. 15, 2005 at 15:51:08 (UTC) (1 days)   |
|   | Location  | 25.304N, 123.263E                                    |
|   | Region    | NORTHEAST OF TAIWAN                                  |
| 5.| 20-23s| 178e-180                                         |
|   | Mag       | 5.4                                                  |
|   | Date-Time | Friday, Oct. 14, 2005 at 03:36:45 (UTC) (same day)   |
|   | Location  | 23.710S, 176.003W                                    |
|   | Region    | SOUTH OF THE FIJI ISLANDS                            |

18 Oct. 2005

|    |           |                                                      |
|----|-----------|------------------------------------------------------|
| 6. | 10-11s| 75-76w                                           |
|    | Mag       | 5.0                                                  |
|    | Date-Time | Tuesday, Oct. 18, 2005 at 08:42:13 (UTC) (same day)  |
|    | Location  | 14.176° S, 72.608° W                                 |
|    | Region    | CENTRAL PERU                                         |
|    | Mag       | 4.8                                                  |
|    | Date-Time | Thursday, Oct. 20, 2005 at 19:30:22 (UTC) (2 days)   |
|    | Location  | 13.49° S, 70.20° W                                   |
|    | Region    | CENTRAL PERU                                         |
| 7. | 2-3n  | 127-128e                                         |
|    | Mag       | 5.2                                                  |
|    | Date-Time | Saturday, Oct. 29, 2005 at 01:17:32 (UTC) (11 days)  |
|    | Location  | 2.553N, 127.009E                                     |
|    | Region    | MOLUCCA SEA                                          |
| 8. | 37-38n| 142-143e                                         |
|    | Mag       | 4.9                                                  |
|    | Date-Time | Monday, Oct. 17, 2005 at 18:48:26 (UTC) (−1 days)    |
|    | Location  | 37.892° N, 142.061° E                                |
|    | Region    | OFF THE EAST COAST OF HONSHU, JAPAN                  |
|    | Mag       | 6.4                                                  |
|    | Date-Time | Wednesday, Oct. 19, 2005 at 11:44:43 (UTC) (1 day)   |
|    | Location  | 36.374° N, 140.849° E                                |
|    | Region    | NEAR THE EAST COAST OF HONSHU, JAPAN                 |
|    | Mag       | 5.5                                                  |
|    | Date-Time | Saturday, Oct. 22, 2005 at 13:12:47 (UTC) (4 days)   |
|    | Location  | 37.118° N, 140.913° E                                |
|    | Region    | EASTERN HONSHU, JAPAN                                |
|    | Mag       | 5.9                                                  |
|    | Date-Time | Sunday, Oct. 23, 2005 at 10:08:13 (UTC) (5 days)     |
|    | Location  | 37.372° N, 134.490° E                                |
|    | Region    | SEA OF JAPAN11. 17-18s 69-70w                        |
|    | Mag       | 4.8                                                  |
|    | Date-Time | Thursday, Oct. 20, 2005 at 10:02:23 (UTC) (2 days)   |
|    | Location  | 20.761° S, 70.363° W                                 |
|    | Region    | OFFSHORE TARAPACA, CHILE                             |
|    | Mag       | 5.6                                                  |
|    | Date-Time | Sunday, Oct. 23, 2005 at 04:49:17 (UTC) (5 days)     |
|    | Location  | 21.541° S, 68.185° W                                 |
|    | Region    | ANTOFAGASTA, CHILE                                   |
| 9. | 51-52n| 159-160e                                         |
|    | Mag       | 5.7                                                  |
|    | Date-Time | Thursday, Oct. 20, 2005 at 15:26:32 (UTC) (2 days)   |
|    | Location  | 52.334° N, 169.109° W                                |
|    | Region    | FOX ISLANDS, ALEUTIAN ISLANDS, ALASKA                |
| 10.| 28-29n| 139-140e                                         |
|    | Mag       | 5.0                                                  |
|    | Date-Time | Thursday, Oct. 27, 2005 at 08:41:46 (UTC) (9 days)   |
|    | Location  | 30.851N, 138.494E                                    |
|    | Region    | IZU ISLANDS, JAPAN REGION                            |
| 11.| 14-15s| 179-180w                                         |
|    | Mag       | 5.3                                                  |
|    | Date-Time | Monday, Oct. 24, 2005 at 00:44:43 (UTC) (6 days)     |
|    | Location  | 15.16° S, 172.95° W                                  |
|    | Region    | Samoa Islands Region                                 |

24 Feb. 2006

|    |            |                  |
|----|------------|------------------|
| 1) | 46N 27E| Romania      |
|    | Source 20/2| x = 126 y = 44   |

-continued

|   | | |
|---|---|---|
|   | 06/03 | 45.69N 26.45E |
|   |   | ROMANIA |
|   |   | Mag 4.6 |
|   | Or 46N 151E | Kuril Island |
|   | 09/03 | 45.12N 151.6E |
|   |   | KURIL ISLANDS |
|   |   | Mag 5.2 |
|   | 14/03 | 47.96N 147.2E |
|   |   | NORTHWEST OF KURIL ISLANDS |
|   |   | Mag 5.3 |
| 3) | _37N 30E_ | _Turkey/Cyprus region_ |
|   | Source 4/3 | x = 115 y = 30 |
|   | 09/03 | 37.868N 26.654E |
|   |   | Dodecanese Islands, Greece |
|   |   | Mag 4.3 |
| 4) | _6S 128E_ |   |
|   | Source 3/3 | x = 110 y = 113 |
|   |   | The main trigger |
|   | 14/03 | 3.60S 127.19E |
|   |   | SERAM, INDONESIA |
|   |   | Mag 6.8 |
|   | 17/03 | 5.22S 123.13E |
|   |   | BANDA SEA |
|   |   | Mag 5.6 |
|   | 17/03 | 7.50S 125.16E |
|   |   | BANDA SEA |
|   |   | Mag 5.6 |
|   | 18/03 | 4.68S 126.2E |
|   |   | TALAUD ISLANDS, INDONEDIA |
|   |   | Mag 5 |
| 5) | _6S 115E_ |   |
|   | Source | 5/3 x = 80 y = 48 |
|   | 16/03 | 7.38S 106.72E |
|   |   | JAWA, INDONESIA |
|   |   | Mag 5.1 |
| 6) | _13S 170E_ |   |
|   | Source 2/3 | x = 109 y = 135 |
|   |   | The main trigger |
|   | 7/03 | 14.83S 167.34E |
|   |   | VANUATU ISLANDS |
|   |   | Mag 6.2 |
|   | 17/03 | 14.98S 167.39E |
|   |   | VANUATU ISLANDS |
|   |   | Mag 5.2 |
|   | 17/03 | 15.27S 175.82E |
|   |   | TONGA ISLANDS |
|   |   | Mag 5.2 |
|   | 19/03 | 13.57S 172.41E |
|   |   | VAUNUATU REGION |
|   |   | Mag 5.8 |
| 7) | _3S Source 4/3 x=100 y=68 - longitude unclear_ |   |
|   |   | The main trigger |
|   | 12/03 | 5.05S 153.65E |
|   |   | NEW IRELAND REGION, P.N.G. |
|   |   | Mag 5.9 |
|   | 14/03 | 3.91S 151.59E |
|   |   | NEW IRELAND REGION, P.N.G. |
|   |   | Mag 5.4 |
|   | 17/03 | 4.92S 149.92E |
|   |   | BISMARCK SEA |
|   |   | Mag 5. |

Figure 9:
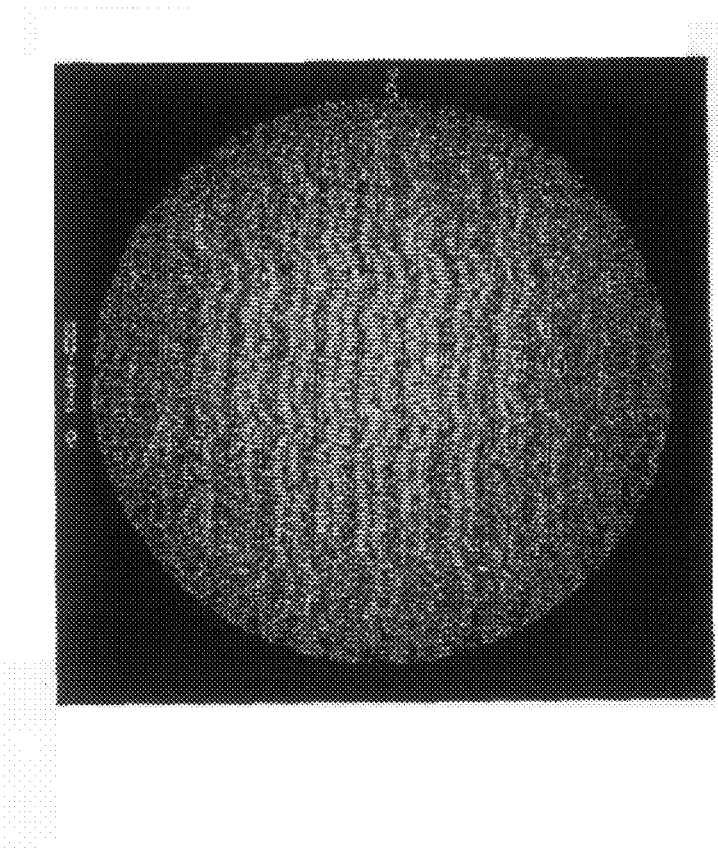
FIG. 9 illustrates a magnetogram image showing sunspots 0743 and 0742 taken on Mar. 19, 2005.
Figure 10:
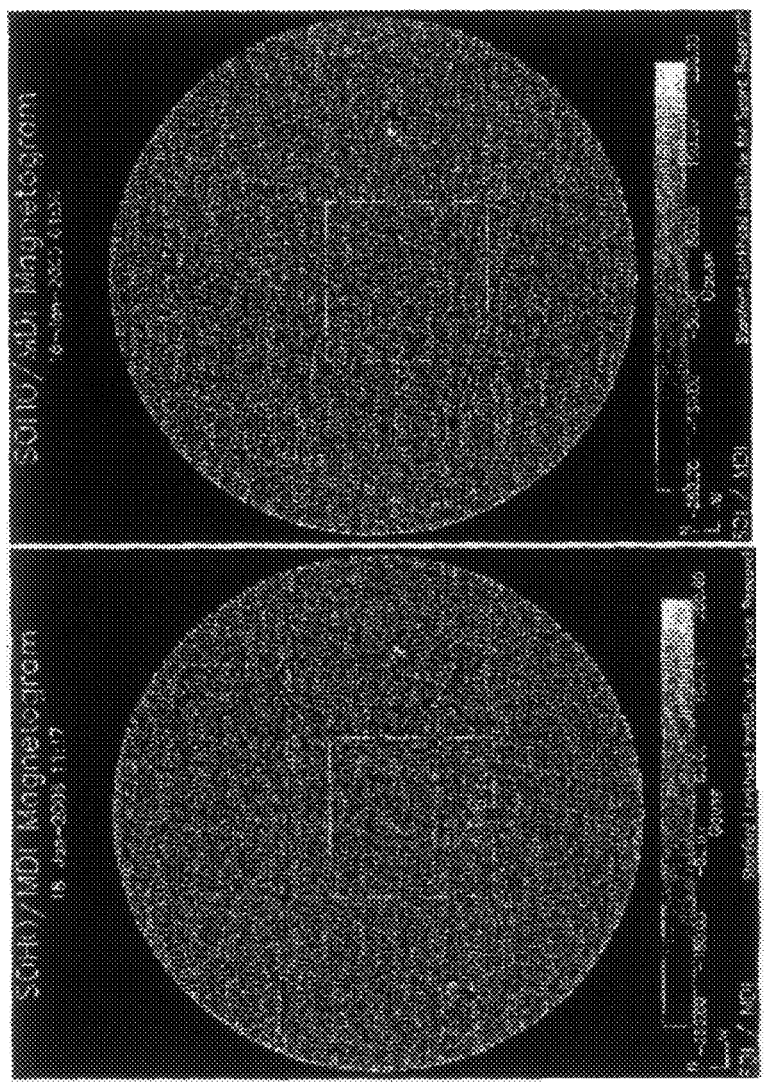
FIG. 10 illustrates 2 magnetogram images taken by SOHO and sun disturbances.
Figure 11:
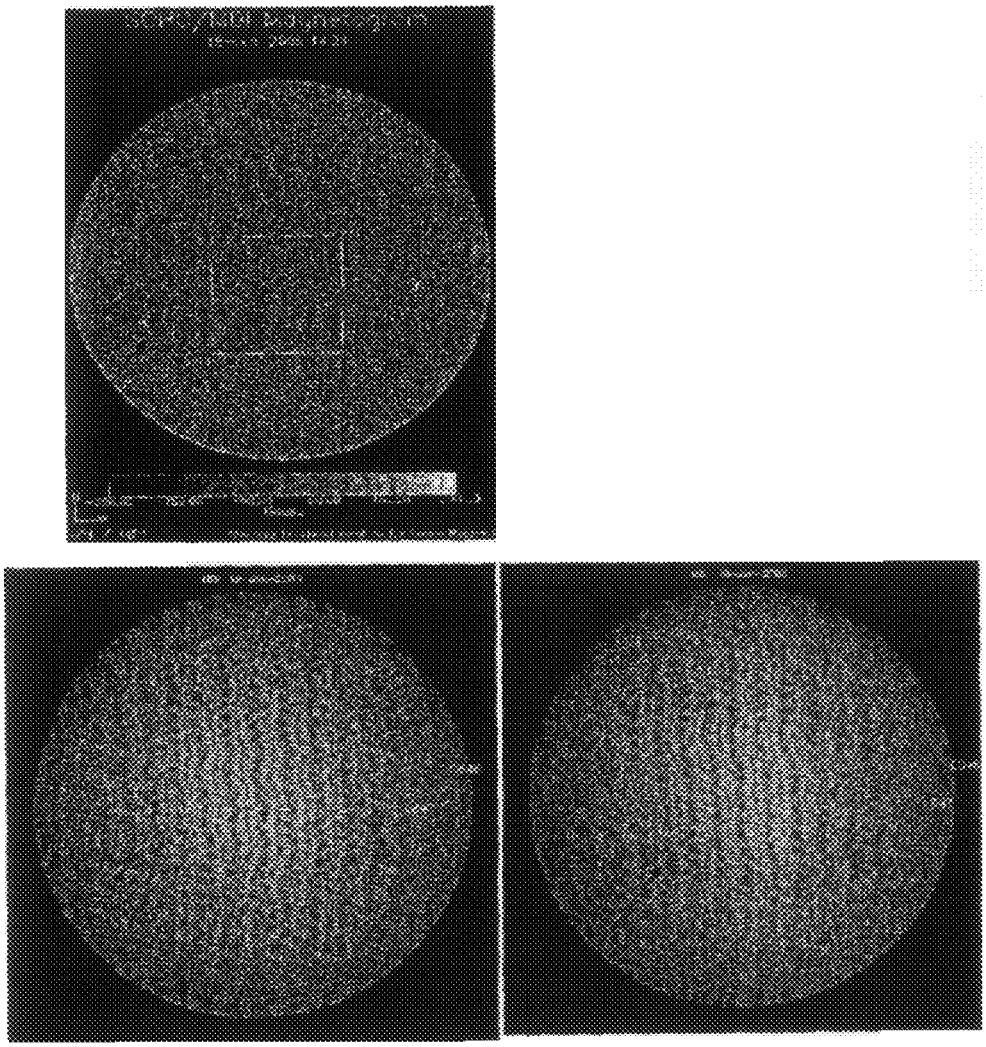
FIG. 11 illustrates 3 magnetogram images taken by SOHO and sun disturbances.

Reference is now made to FIGS. 9-11 illustrating different magnetogram images. The following examples represent major earthquakes events that are shown with relation to sunspots in FIGS. 9-11, respectively. The magnetograms were analyzed in accordance with the method of the present invention explained herein before.

1. an earthquake occurred in Sumatra (3.3N-96E) of Mag.9 on 26.12.04 (and consequently tsunami). According to the calculations made on the magnetograms shown in FIG. 10, the following results were calculated:

Average sun's B.O. (−1)

Earth's declination 23.3 S

No data available 21.12.04 from SOHO (possibly because of flares or controlled bakeout)

Average data taken from B.B.S.O.

| Data from | | Fusion point | | Estimated Lat. Location |
|---|---|---|---|---|
| SOHO | Sunspot No. | X | Y | after calculation |
| 21.12.04 | 714 | 89 | 73 | 3-S |

2. In Sumatra (2.1N-97E) an earthquake of mag. 8.7 occurred on 28.3.05
from the calculations:
Average sun's B.O. (−7)
Earth's declination N 2.8

| Data from SOHO | Sunspot No. | Fusion no. X | Y | Estimated lat. Location after calculation |
|---|---|---|---|---|
| 19.3.05 | 744 | 93.5 | 74 | 2-N |
|  |  | 93 | 74 | 3N Total 2-3 N |

3. Banda Sea (5.4S-128.1E) experienced an earthquake of Mag. 7.7 that occurred on 27.1.06. The calculations showed:
Average sun's B.O. (−5)
Earth's declination S 20.6

| Data from SOHO | Sunspot No. | Fusion point X | Y | Magnetogram X | Y | EIT 171 X | Y | Estimated lat. Location after calculation |
|---|---|---|---|---|---|---|---|---|
| 18.1.06 | 848 | 79-48 80-52 | 6-5 5-5 | 77 | 47 (5.5) | 77 | 47 (5.5) | 5-6 S |

It should be noted that according to the model illustrated herein, a mathematical calculation can be developed. This mathematical calculation can automatically perform the correlation needed in order to predict an earthquake from sun disturbances in a mathematical manner known in the art such as trial and error.

It should be clear that the description of the embodiments and attached Figures set forth in this specification serves only for a better understanding of the invention, without limiting its scope as covered by the following Claims.

It should also be clear that a person skilled in the art, after reading the present specification can make adjustments or amendments to the attached Figures and above described embodiments that would still be covered by the following Claims.

TABLE 1

| | | ('Y' axis on Broadsheet) | | | | | | | | | | |
|---|---|---|---|---|---|---|---|---|---|---|---|---|
| | Invisible | 180 | 160 | 140 | 120 | 100 | 80 | 60 | 40 | 20 | Invisible | |
| 00:00 | 90 | 105 | 120 | 135 | 150 | 165 | 180 | 165 | 150 | 135 | 120 | 105 | 90 |
| 01:00 | 105 | 120 | 135 | 150 | 165 | 180 | 165 | 150 | 135 | 120 | 105 | 90 | 75 |
| 02:00 | 120 | 135 | 150 | 165 | 180 | 165 | 150 | 135 | 120 | 105 | 90 | 75 | 60 |
| 03:00 | 135 | 150 | 165 | 180 | 165 | 150 | 135 | 120 | 105 | 90 | 75 | 60 | 45 |
| 04:00 | 150 | 165 | 180 | 165 | 150 | 135 | 120 | 105 | 90 | 75 | 60 | 45 | 30 |
| 05:00 | 165 | 180 | 165 | 150 | 135 | 120 | 105 | 90 | 75 | 60 | 45 | 30 | 15 |
| 06:00 | 180 | 165 | 150 | 135 | 120 | 105 | 90 | 75 | 60 | 45 | 30 | 15 | 0 |
| 07:00 | 165 | 150 | 135 | 120 | 105 | 90 | 75 | 60 | 45 | 30 | 15 | 0 | 15 |
| 08:00 | 150 | 135 | 120 | 105 | 90 | 75 | 60 | 45 | 30 | 15 | 0 | 15 | 30 |
| 09:00 | 135 | 120 | 105 | 90 | 75 | 60 | 45 | 30 | 15 | 0 | 15 | 30 | 45 |
| 10:00 | 120 | 105 | 90 | 75 | 60 | 45 | 30 | 15 | 0 | 15 | 30 | 45 | 60 |
| 11:00 | 105 | 90 | 75 | 60 | 45 | 30 | 15 | 0 | 15 | 30 | 45 | 60 | 75 |
| 12:00 | 90 | 75 | 60 | 45 | 30 | 15 | 0 | 15 | 30 | 45 | 60 | 75 | 90 |
| 13:00 | 75 | 60 | 45 | 30 | 15 | 0 | 15 | 30 | 45 | 60 | 75 | 90 | 105 |
| 14:00 | 60 | 45 | 30 | 15 | 0 | 15 | 30 | 45 | 60 | 75 | 90 | 105 | 120 |
| 15:00 | 45 | 30 | 15 | 0 | 15 | 30 | 45 | 60 | 75 | 90 | 105 | 120 | 135 |
| 16:00 | 30 | 15 | 0 | 15 | 30 | 45 | 60 | 75 | 90 | 105 | 120 | 135 | 150 |
| 17:00 | 15 | 0 | 15 | 30 | 45 | 60 | 75 | 90 | 105 | 120 | 135 | 150 | 165 |
| 18:00 | 0 | 15 | 30 | 45 | 60 | 75 | 90 | 105 | 120 | 135 | 150 | 165 | 180 |
| 19:00 | 15 | 30 | 45 | 60 | 75 | 90 | 105 | 120 | 135 | 150 | 165 | 180 | 165 |
| 20:00 | 30 | 45 | 60 | 75 | 90 | 105 | 120 | 135 | 150 | 165 | 180 | 165 | 150 |
| 21:00 | 45 | 60 | 75 | 90 | 105 | 120 | 135 | 150 | 165 | 180 | 165 | 150 | 135 |
| 22:00 | 60 | 75 | 90 | 105 | 120 | 135 | 150 | 165 | 180 | 165 | 150 | 135 | 120 |
| 23:00 | 75 | 90 | 105 | 120 | 135 | 150 | 165 | 180 | 165 | 159 | 135 | 120 | 105 |

Direction of Earth's rotation

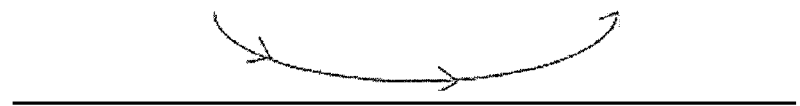

TABLE 2

| Earthquakes | | | | Disturbances on magnetogram | | | | |
|---|---|---|---|---|---|---|---|---|
| Date | Lat | Long | Mag | Date | Sun No. | X | Y | Calculated latitude |
| 01 | 54.65 S | 01.25 E | 5.1 | 29.7.03 | Disturbance | 57 | 57 | 52 S |
| 01 | 32.77 N | 141.12 E | 5.2 | 29.7.03 | Disturbance | 120 | 101 | 30 N |
| 02 | 9.96 S | 124.64 E | 4.9 | | | | | |
| 02 | 7.48 S | 128.36 E | 4.9 | | | | | |
| 03 | 30.74 S | 179.19 W | 5.0 | | | | | |
| 03 | 56.11 N | 153.32 W | 5.2 5.3 | | | | | |
| 03 | 58.91 S | 25.56 W | 4.9 | | | | | |
| 03 | 40.49 S | 176.03 E | 5.3 | 27.7.03 | Disturbance | 74 | 46 | 40.5 S |
| 03 | 17.69 S | 174.41 W | 4.9 | 31.7.03 | Disturbance | 67 | 101 | 18.5 S |
| 03 | 3.69 N | 118.76 E | 4.9 | | | | | |
| 03 | 22.57 S | 177.01 W | 5.2 | 29.7.03 | Disturbance | 105 | 30 | 22 S |
| 04 | 65.99 N | 5.47 E | 4.9 | | | | | |
| 04 | 29.08 N | 59.75 E | 5.3 | 31.7.03 | Disturbance | 109 | 120 | 27.5 N |
| 04 | 60.53 S | 43.41 W | 6.2 7.5 | 29.7.03 | | 38 | 72 | 60S |
| 04 | 60.54 S | 44.44 W | 5.4 | 1.8.03 | 424 | 73 | 27 | 58 S |
| 04 | 21.99 N | 120.59 E | 5.0 | 27.7.03 | Disturbance | 122 | 77 | 19.5 N |
| 04 | 44.64 N | 148.58 E | 4.9 | | | | | |
| 04 | 6.06 N | 126.29 E | 5.2 | 28.7.03 | Disturbance | 110 | 66 | 4 N |
| 04 | 21.82 N | 169.32 E | 5.1 | | | | | |
| 05 | 20.94 S | 178.9 W | 5.1 | | | | | |
| 05 | 23.69 N | 70.44 E | 5.1 | 4.8.03 | Disturbance | 116 | 96 | 23 N |
| 05 | 4.61 S | 153.63 E | 4.9 | | | | | |
| 05 | 0.52 S | 29.45 E | 5.3 | 2.8.03 | Disturbance | 73 | 129 | 3.5 S |
| 06 | 43.38 N | 147.28 E | 5.3 | 30.7.03 | Disturbance | 114 | 157 | 44 N |
| 06 | 15.58 S | 173.13 W | 5.1 | 29.7.03 | Disturbance | 80 | 82 | 15 S |
| 06 | 30.58 S | 178.02 W | 5.1 | 2.8.03 | Disturbance | 60 | 89 | 31 S |
| 06 | 7.66 N | 36.68 W | 5.0 | 2.8.03 | Disturbance | 98 | 102 | 9 N |
| 06 | 15.50 S | 13.20 W | 4.9 | | Disturbance | | | |
| 07 | 17.72 S | 172.99 W | 5.0 5.2 | 2.8.03 | Disturbance | 78 | 79 | 18 S |
| 07 | 00.75 N | 125.28 E | 4.9 | | | | | |
| 07 | 03.95 S | 136.91 E | 4.9 | 7.8.03 | 430 | 82 | 102 | 4 S |
| 08 | 13.80 S | 71.81 W | 4.9 | 3.8.03 | Disturbance | 77 | 77 | 15 S |
| 08 | 26.69 N | 97.04 E | 5.0 | 4.8.03 | Disturbance | 116 | 105 | 28 N |
| 09 | 51.50 N | 171.21 W | 5.2 | | | | | |
| 09 | 32.91 S | 178.54 W | 5.0 | | | | | |
| 10 | 06.62 S | 147.90 E | 4.9 5.0 | 6.8.03 | Disturbance | 75 | 117 | 5 S |
| 11 | 1.14 N | 128.15 E | 5.7 | 7.8.03 | Disturbance | 82 | 117 | 00 |
| 11 | 18.35 N | 106.04 W | 5.1 | | | | | |
| 11 | 20.20 S | 69.74 W | 5.0 | 5.8.03 | Disturbance | 82 | 66 | 21 S |
| 11 | 33.01 S | 178.38 W | 4.9 | | | | | |
| 11 | 56.91. S | 147.61 E | 5.6 5.7 | 5.8.03 | Disturbance | 64 | 63 | 55 S |
| 11 | 12.12 N | 93.53 E | 5.5 | 9.8.03 | Disturbance | 121 | 25 | 11 N |
| 12 | 51.17 N | 159.05 E | 5.1 | | | | | |
| 12 | 20.48 N | 121.38 E | 4.9 | 7.8.03 | Disturbance | 123 | 75 | 20 N |
| 13 | 17.65 N | 173.07 N | 4.9 | 7.8.03 | Disturbance | 76 | 82 | 18 S |
| 13 | 09.36 N | 79.94 W | 5.0 | | | | | |
| 13 | 30.58. S | 178.11 W | 5.1 | 12.8.03 | Disturbance | 85 | 42 | 30 S |
| 13 | 9.83 S | 119.01 E | 5.0 | 5.8.03 | Disturbance | 84 | 82 | 10 S |
| 13 | 14.28 N | 90.09 W1 | 5.0 | 10.8.03 | Disturbance | 131 | 51 | 15 N |
| 14 | 39.16 N | 20.61 E | 5.6 6.2 | | | | | |
| 14 | 60.54 S | 43.89 W | 5.3 | 12.8.03 | Disturbance | 52 | 53 | 60 S |
| 14 | 11.65 N | 126.71 E | 4.9 | 9.8.03 | Disturbance | 114 | 73 | 12 N |
| 14 | 38.83 N | 20.57 E | 5.1 5.2 | | | | | |
| 14 | 19.90 S | 177.98 W | 5.2 | | | | | |
| 14 | 21.12 N | 146.56 E | 5.0 | 4.8.03 | Disturbance | 130 | 70 | 23 N |
| 14 | 55.58 N | 162.38 E | 4.9 | | | | | |
| 15 | 40.99 N | 125.43 W | 5.1 | | | | | |
| 15 | 28.15 N | 113.22 W | 4.9 | 10.8.03 | Disturbance | 105 | 130 | 27 N |
| 15 | 33.14 S | 178.55 W | 5.0 | 13.8.03 | 432 | 93 | 24 | 33 S |
| 15 | 11.99 N | 143.10 E | 4.9 | | | | | |
| 16 | 43.77 N | 119.64 E | 5.5 | 11.8.03 | Disturbance | 119 | 147 | 45 N |
| 16 | 05.47 S | 151.14 E | 5.2 | 11.8.03 | Disturbance | 74 | 116 | 7 S |
| 16 | 4.62 S | 151.82 E | 5.3 | 11.8.03 | Disturbance | 79 | 112 | 4 S |
| 16 | 05.62 N | 151.82 E | 5.3 | | | | | |
| 17 | 20.35 N | 121.83 E | 5.2 | 13.2.03 | Disturbance | 62 | 112 | 21 N |
| 18 | 29.57 N | 95.60 E | 5.6 | 14.8.03 | Disturbance | 110 | 111 | 26 N |
| 18 | 37.63 N | 139.97 E | 4.9 | | | | | |
| 18 | 35.63 N | 139.97 | 4.9 | 15.8.03 | Disturbance | 138 | 74 | 35 N |

TABLE 2-continued

| Earthquakes | | | | Disturbances on magnetogram | | | | |
|---|---|---|---|---|---|---|---|---|
| Date | Lat | Long | Mag | Date | Sun No. | X | Y | Calculated latitude |
| 19 | 32.93 S | 179.21 W | 5.2 | 14.8.03 | 433 | 65 | 59 | 35 S |
| 19 | 29.12 N | 129.34 E | 4.9 | | | | | |
| 19 | 05.82 S | 147.03 E | 4.9 | 12.8.03 | Disturbance | 89 | 85 | 4 S |
| 19 | 21.99 S | 179.55 W | 5.0 | 18.8.03 | Disturbance | 87 | 53 | 21 S |
| 20 | 11.40 S | 166.22 E | 5.0 | 16.8.03 | 436 | 111 | 22 | 13 S |
| 20 | 30.30 N | 41.92 W | 4.9 | 14.8.03 | Disturbance | 110 | 127 | 30 N |
| 21 | 00.02 N | 126.77 E | 4.9 | | | | | |
| 21 | 1467. N | 52.24 E | 4.9 | | | | | |
| 21 | 45.10 S | 167.14 E | 6.6 7.5 | 8.8.03 | 431 | 83 | 25 | 45 S |
| 21 | 02.25 N | 96.53 E | 5.1 | 15.8.03 | Disturbance | 116 | 49 | 2.5 N |
| 21 | 68.69 N | 148.04 W | 5.2 | | | | | |
| 22 | 03.13 N | 77.87 W | 5.0 | 17.8.03 | Disturbance | 122 | 36 | 2 N |
| 22 | 13.37 S | 167.14 E | 5.0 | 14.8.03 | Disturbance | 63 | 133 | 14.5 S |
| 23 | 00.88 S | 133.70 E | 5.4 | 20.8.03 | Disturbance | 110 | 150 | 1 S |
| 23 | 00.78 N | 125.22 E | 5.0 | | | | | |
| 23 | 27.56 S | 63.26 W | 5.0 | 13.8.03 | Disturbance | 57 | 110 | 27.5 S |
| 24 | 17.45 S | 167.89 E | 5.0 5.1 | | | | | |
| 24 | 40.37 S | 98.26 E | 5.2 | | | | | |
| 25 | 14.03 N | 91.07 W | 5.4 | 14.8.03 | Disturbance | 105 | 101 | 16 N |
| 25 | 08.91 S | 113.18 E | 5.2 | 16.8.03 | Disturbance | 37 | 139 | 10 S |
| 25 | 18.54 N | 106.70 W | 5.5 | 15.8.03 | Disturbance | 105 | 107 | 18 N |
| 26 | 04.81 N | 125.63 E | 4.9 | 15.8.03 | Disturbance | 110 | 64 | 5 N |
| 26 | 20.25 S | 175.73 W | 4.9 | 20.8.03 | Disturbance | 82 | 60 | 22 S |
| 26 | 33.11 S | 179.22 W | 5.1 | 18.8.03 | Disturbance | 85 | 32 | 35 S |
| 26 | 17.156 S | 70.67 W | 5.8 | 14.8.03 | Disturbance | 105 | 101 | 16 N |
| 26 | 05.31 S | 145.23 E | 4.9 | 17.8.03 | Disturbance | 87 | 92 | 4 S |
| 27 | 06.59 S | 147.17 E | 5.1 | 22.8.03 | Disturbance | 72 | 131 | 7 S |
| 27 | 39.16 S | 72.44 W | 5.1 | 19.8.03 | Disturbance | 47 | 110 | 38 |
| S27 | 65.13 S | 179.26 E | 4.9 | 19.8.03 | Disturbance | 48 | 50 | 65 S |
| 27 | 06.78 N | 33.97 W | 5.0 | 26.8.03 | Disturbance | 123 | 32 | 5 N |
| 27 | 43.74 N | 28.92 W | 5.1 | 27.8.03 | Disturbance | 128 | 104 | 42 N |
| 27 | 11.29 N | 57.57 E | 5.3 | 20.8.03 | Disturbance | 89 | 136 | 10 N |
| 28 | 49.82 S | 114.81 W | 5.4 6.1 | 26.8.03 | Disturbance | 64 | 39 | 50 S |
| 28 | 55.85 S | 146.84 E | 5.1 | | | | | |
| 28 | 07.32 S | 126.05 E | 5.6 | 23.8.03 | Disturbance | 109 | 41 | 7 S |
| 28 | 05.04 S | 103.51 E | 5.0 | 23.8.03 | Disturbance | 110 | 34 | 6.5 S |
| 28 | 56.10 S | 143.60 W | 5.0 | | | | | |
| 28 | 21.98 S | 179.58 W | 5.1 | 22.8.03 | Disturbance | 63 | 110 | 22 S |
| 28 | 00.21 N | 126.18 E | 5.1 | | | | | |
| 28 | 13.16 N | 145.33 E | 5.3 | | | | | |
| 29 | 26.27 S | 177.26 W | 5.3 | 17.8.03 | 437 | 31 | 103 | 26 S |
| 29 | 14.95 S | 176.8 W | 4.9 | 24.8.03 | Disturbance | 99 | 37 | 16 S |
| 29 | 59.29 S | 24.88 W | 5.2 | | | | | |
| 29 | 02.32 S | 139.58 E | 5.1 | 21.8.03 | Disturbance | 83 | 108 | 2 S |
| 29 | 60.56 S | 43.21 W | 4.9 | | | | | |
| 29 | 30.90 S | 178.87 W | 4.9 | | | | | |
| 29 | 05.43 S | 102.23 E | 5.1 | 25.8.03 | Disturbance | 76 | 113 | 7 S |
| 30 | 14.80 S | 167.24 E | 5.2 | 28.8.03 | Disturbance | 86 | 58 | 17 S |
| 30 | 73.27 N | 06.42 E | 5.0 | | | | | |
| 30 | 30.76 S | 178.24 W | 5.1 | | | | | |
| 30 | 41.86 N | 142.55 E | 5.2 | 28.8.03 | Disturbance | 120 | 138 | 40 N |
| 31 | 10.54 N | 146.35 E | 5.8 | 27.8.03 | Disturbance | 106 | 83 | 11 N |
| 31 | 13.86 N | 119.75 E | 5.3 | | | | | |
| 31 | 43.39 N | 132.27 E | 5.5 | 28.8.03 | Disturbance | 120 | 138 | 40 N |

The invention claimed is:

1. A method of correlating earthquakes on earth to electromagnetic disturbances on the sun comprising:
   mapping coordinates of electromagnetic disturbances on the sun;
   calculating said coordinates;
   mapping the calculated coordinates onto a location and time on earth;
   whereby the location and time on earth predicts the location and approximate time of the earthquake which will consequently occur on earth.

2. The method as claimed in claim 1, wherein the electromagnetic disturbances are based on those observed on EIT images.

3. The method as claimed in claim 1, wherein the electromagnetic disturbances are based on those observed on a magnetogram image.

4. The method as claimed in claim 1, wherein said mapping coordinates is performed by marking the disturbances on a transparency of sun's diameter on a grid and transferring the marked coordinated onto a broadsheet.

5. The method as claimed in claim 1, wherein said mapping the calculated coordinates is performed by marking said coordinates on a scaled BO transparency divided into lines of latitude.

6. The method as claimed in claim 1, wherein said location is determined from the line of latitude using a model in which an angle of declination of a corresponding day is adjusted to the indications of sunspot disturbances from the broadsheet transparency and wherein the centre of the BO transparency is lined up to the center of the broadsheet and rotated to the daily declination, and wherein the center of the BO transparency is also moved up or down along the center of the broadsheet in accordance with the daily declination.

7. The method as claimed in claim 1, further comprising determining the location of a potential earthquake on the line of longitude.

8. The method as claimed in claim 7, wherein determining the location of the potential earthquake on the line of longitude is performed by identifying the disturbances on an EIT and a magnetogram image.

9. The method as claimed in claim 7, wherein determining the location of the potential earthquake on the line of longitude is further comprises a: referencing to the pattern archive (EMI Archive); b. statistical analyzing the location of tectonic plates that indicated current seismic activity and c. geological mapping of characteristics of the earth's crust.

10. The method as claimed in claim 1, further comprising enhancing results from the coordinates harvested from EIT and magnetogram images.

11. The method as claimed in claim 10, wherein enhancing the results comprising: a. using a global seismic map; b. examining historic seismic activity of the earth such as occurrence, magnitude and depth and c. taking into consideration the movements of the tectonic plates.

12. The method as claimed in claim 1, wherein the prediction of the earthquake is performed by an online simulator.

13. The method as claimed in claim 1, wherein the earthquake has a magnitude that is calculated by the shape of the pattern, the speed in which the sun disturbance develops and the size and location of the disturbance.

* * * * *